United States Patent
Riedhammer

[11] Patent Number: 6,131,475
[45] Date of Patent: Oct. 17, 2000

[54] GEAR CONTROL SYSTEM FOR A SYNCHRO-SHUTTLE GEAR OR POWER SHIFT GEAR

[75] Inventor: Michael Riedhammer, Bermatingen, Germany

[73] Assignee: ZF Friedrichshafen AG, Friedrichshafen, Germany

[21] Appl. No.: 09/077,240

[22] PCT Filed: Dec. 5, 1996

[86] PCT No.: PCT/EP96/05426

§ 371 Date: May 22, 1998

§ 102(e) Date: May 22, 1998

[87] PCT Pub. No.: WO97/21942

PCT Pub. Date: Jun. 19, 1997

[30] Foreign Application Priority Data

Dec. 14, 1995 [DE] Germany ............................ 195 46 630

[51] Int. Cl.[7] .................................................. F16H 61/00
[52] U.S. Cl. .................. 74/335; 192/87.18; 137/625.64; 91/461
[58] Field of Search ........................... 74/335; 192/87.13, 192/87.18, 87.15, 87.19, 3.57, 3.58; 477/79; 137/625.64, 596.16; 91/461

[56] References Cited

U.S. PATENT DOCUMENTS

| | | | |
|---|---|---|---|
| 3,606,906 | 9/1971 | Shore | ...................................... 137/112 |
| 3,823,801 | 7/1974 | Arnold | ................................. 192/87.19 |
| 4,041,972 | 8/1977 | Hoepfl et al. | ............................ 137/269 |
| 4,462,278 | 7/1984 | Murakami et al. | ....................... 74/868 |
| 4,492,251 | 1/1985 | Blake | ............................... 192/87.14 X |
| 4,729,408 | 3/1988 | Coutant | .......................... 137/596.16 X |
| 4,795,017 | 1/1989 | Muncke | ........................... 192/87.19 X |
| 4,936,430 | 6/1990 | Shikata | ............................. 193/87.13 X |
| 5,081,905 | 1/1992 | Yagyu et al. | ................... 137/625.64 X |
| 5,437,204 | 8/1995 | Person | ....................................... 74/335 |
| 5,996,435 | 12/1999 | Reidhammer | ......................... 74/336 R |

FOREIGN PATENT DOCUMENTS 31 17 276 A1  4/1982  Germany.
2 038 964  7/1980  United Kingdom.

*Primary Examiner*—Charles A Marmor
*Assistant Examiner*—Ankur Parekh
*Attorney, Agent, or Firm*—Davis and Bujold

[57] ABSTRACT

The invention relates to a gear control system for a synchro-shuttle gear (1) or powershift gear (2) in particular in machines, comprising switching elements for a forward drive (SEV1, SEV2) or reverse drive (SER) and switching devices for actuating a shift valve (SV1) to select the direction of travel. A control valve (SV2) is provided between the switching elements for forward drive and reverse drive and the shift valve capable of being actuated by the switching devices to select the direction of travel, said control valve (SV2) can be actuated via a further switching device. The control valve can be used as a neutral-position or idling valve in a synchro-shuttle gear or as a reversing valve for the switching elements for forward drive in a powershift gear.

6 Claims, 2 Drawing Sheets

GEAR CONTROL SYSTEM FOR A SYNCHRO-SHUTTLE GEAR OR POWER SHIFT GEAR

The invention concerns a gear control system for a synchro-shuttle gear or a powershift gear.

BACKGROUND OF THE INVENTION

In construction machinery, such as excavator loaders, group transmissions are used in the practice which need at least two actuated switching elements per gear. These group transmissions are either synchromesh gears (also known as synchro-shuttle gears) having hydraulically actuatable switching elements for travel direction only, or powershift or full-throttle powershift gears, the design of which has, in addition to switching elements for selection of travel direction, switching elements with which other reduction ratios can be adjusted, for example, in forward drive.

The control blocks used for controlling said gear designs differ mainly in that the synchromesh gears need a special idling valve, for reasons of safety, by means of which, depending on certain limiting conditions in the vehicle or in the transmission, but independently of the momentary state thereof, an idling speed can be adjusted. To control powershift gears, on the contrary, the gear control system needs its own shifting valve, by means of which it is possible to switch between several gear steps for traveling under load.

Different control blocks with different shift valves and switching elements are thus disadvantageously required for said gear design.

Due to the non-uniform constructional design of the gear control systems high manufacturing costs for the individual shift valves and switching elements, result because of the quantity of parts.

SUMMARY OF THE INVENTION

Therefore, the problem addressed by this invention is to provide a simplified gear control system with universally utilizable control and switching elements which are suited to both synchro-shuttle gears and to powershift gear.

According to the invention, this problem is solved by having a control valve situated between the switching elements for a forward drive or a reverse drive and the shift valve for selection of the travel direction, which is actuatable by the switching devices. The control valve can be actuated by another switching device, and is optionally utilizable as a neutral-position valve or idling valve in a synchro-shuttle gear, or as a shift valve for switching elements for a forward drive in a powershift gear.

With the constructionally simplified gear control system according to the invention, a common control block can be advantageously used unchanged both in a synchro-shuttle gear and in a powershift gear.

Another advantage is that no additional parts are needed in the gear control system according to the invention. Moreover, only the necessary and already existing parts are used in both gear versions, whereby the production cost can be clearly reduced.

The use of uniform parts in both gear designs permits a reduction in the total number of parts by which the design and manufacture of the individual parts can be carried out at specially reasonable cost.

In addition, because of the uniform design of gear parts the supply and stockage of the parts is considerably simplified and less expensive.

Other advantages and advantageous designs of the invention result from the sub-claims and from the embodiment described below in principle with reference to the drawing.

BRIEF DESCRIPTION OF THE DRAWING(S)

In the drawings

FIG. 1 is a fundamental representation of a synchro-shuttle gear for construction machines; and FIG. 2 is a fundamental representation of a powershift gear for construction machinery.

DESCRIPTION OF THE PREFERRED EMBODIMENT(S)

Figure 1:
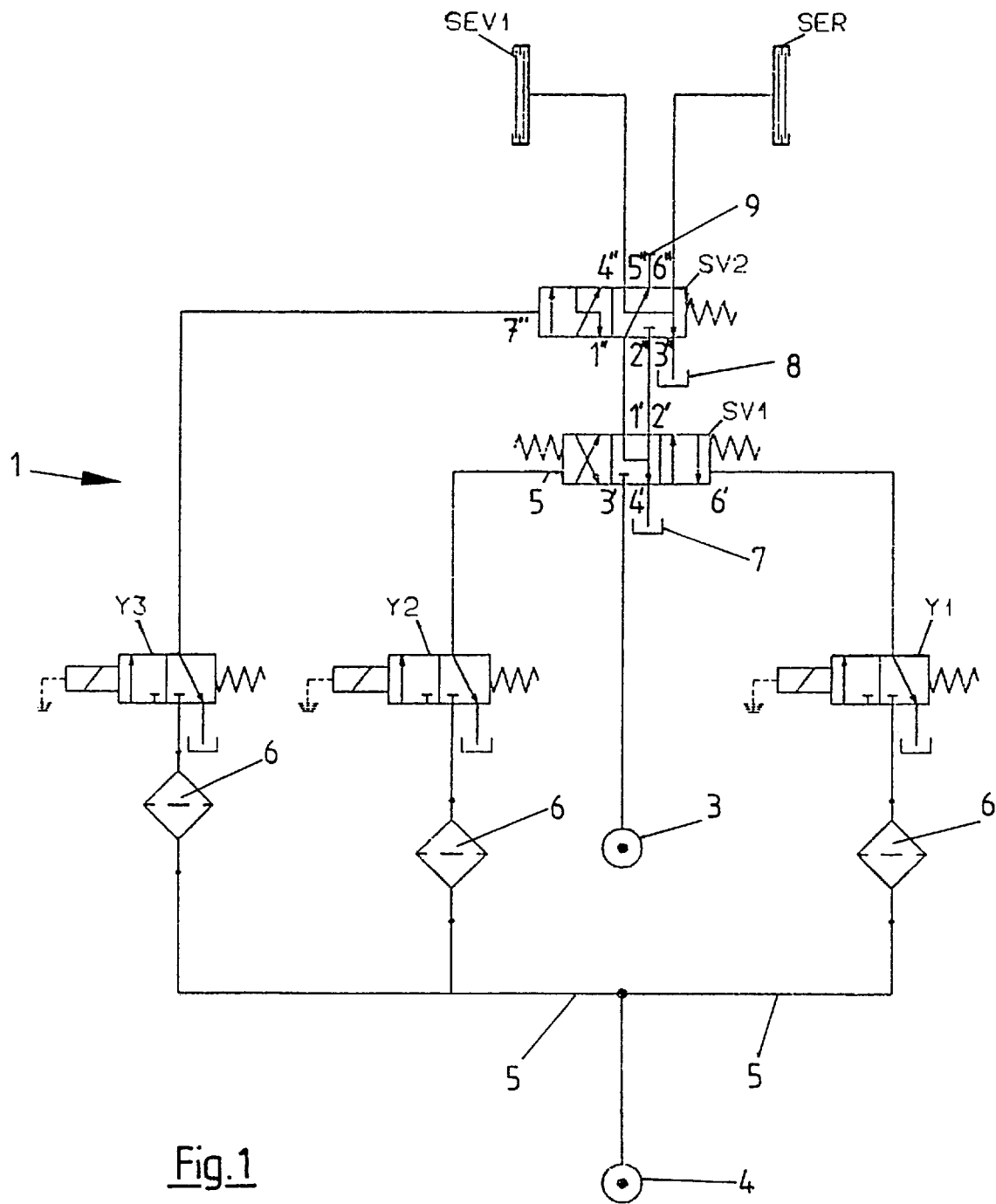
Figure 2:
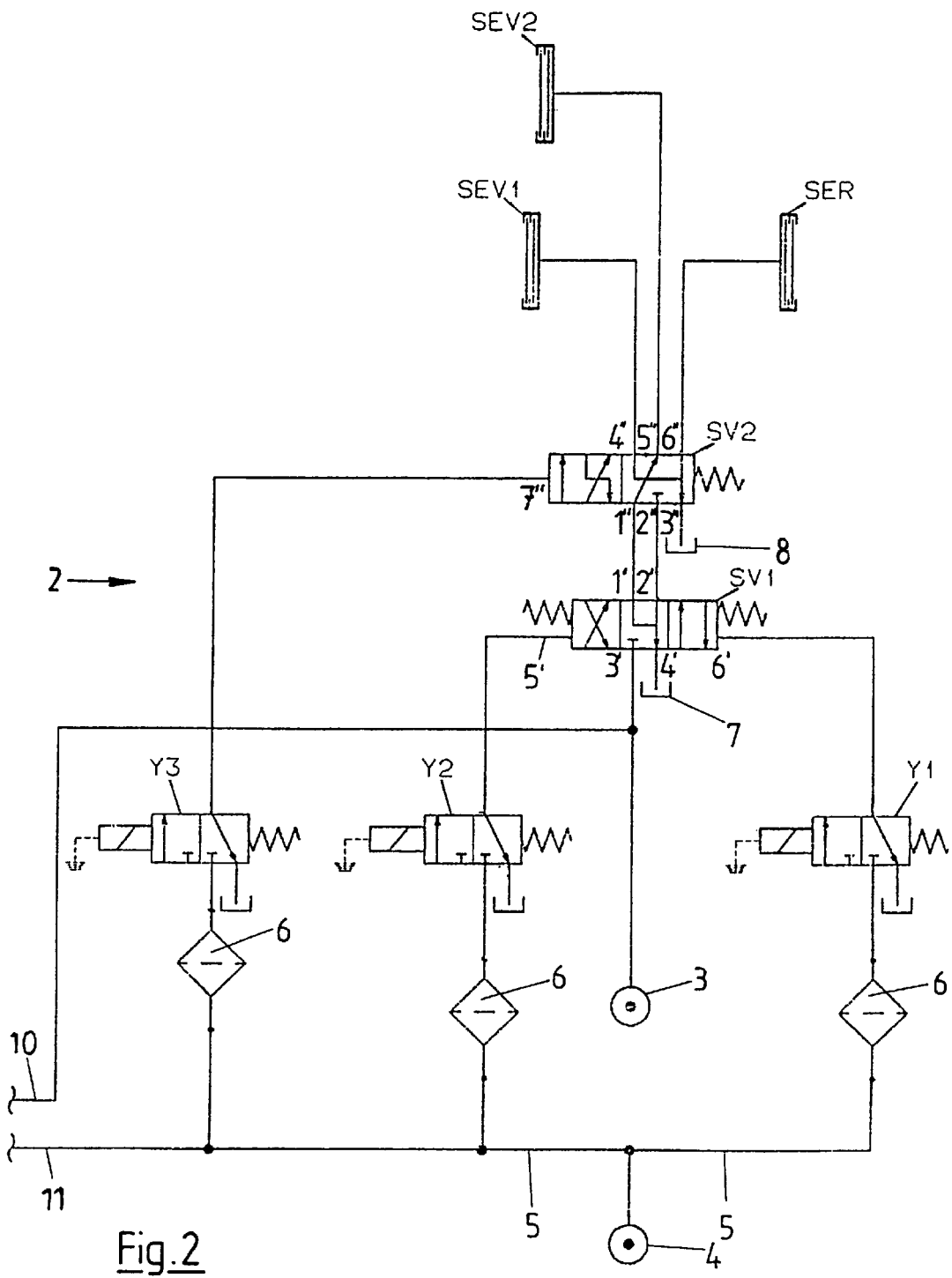

FIG. 1 and FIG. 2 show a gear control system for construction machinery, especially excavator loaders, having switching elements SEV1, SEV2 (FIG. 2 only) for forward drive and one switching element SER for reverse drive. FIG. 1 diagrammatically shows the gear control system for a synchromesh gear or synchro-shuttle gear 1, and FIG. 2 a gear control system of the same kind for a full-throttle gear 2.

In both gear designs, the switching elements SEV1, SEV2, SER are hydraulically loaded with pressure from an external pressure source 3. Between the external pressure source 3 and the switching elements SEV1, SEV2, SER are respectively situated one shift valve SV1 for selection of travel direction and one control valve SV2. The shift valve SV1 is actuated by two switching devices Y1, Y2 (designed to be electromagnetic valves) and the control valve SV2 is actuated by another switching device Y3 (also designed to be an electromagnetic valve). The electromagnetic valves Y1, Y2, Y3 can be loaded for this purpose via pressure lines 5 with a pilot pressure from another pressure source 4. A feed-in filter 6 is situated in each pressure line 5 between the electromagnetic valves Y1, Y2, Y3 and the pressure source 4 for the pilot pressure.

It is thus advantageously possible to apply a pressure to the switching elements SEV1, SEV2, SER different from that applied to the electromagnetic valves Y1, Y2, Y3.

In another design (not shown) the gear control system can be designed with only one pressure source, a pressure-reduction valve therefore being needed.

The shift valve SV1 is connected via a port 3' to the pressure source 3, via ports 5' and 6' to the electromagnetic valves Y1, Y2, and via ports 1' and 2' to the control valve SV2, and has a port or outlet opening 4' connected to a tank 7 for removing pressurized medium. In both gear designs the shift valve SV1 has the same function of shifting from a forward drive to a reverse drive and viceversa.

On the other hand, the control valve SV2, in the synchro-shuttle gear of FIG. 1, which in both gear designs is constructionally identical, has a different task from the one in the full-throttle gear 2 of FIG. 2. Thus, the control valve SV2 serves as a neutral-position or idling valve in the synchro-shuttle gear 1 while, in the full-throttle gear 2, it functions as a shift valve between the switching elements SEV1 and SEV2.

The control valve SV2 is constructionally designed so as to have seven ports 1" to 7", the ports 1" and 2" serving to supply pressurized medium from the shift valve SV1, the port 7" leading to the electromagnetic valve Y3 which switches the control valve SV2, the ports 4", 5" and 6" connecting the switching elements SEV1, SEV2 and SER, and the port 3" connecting to a tank 8 through which the pressure from the switching elements SEV1, SEV2, SER can be withdrawn. In both gear designs the port 4" is connected with the switching element SEV1 for forward drive, and the port 6" is connected with the switching element SER for reverse drive. The port 5" of the control valve SV2 is designed so that the control valve SV2 can be used both in a synchro-shuttle gear 1, according to FIG. 1, and in a powershift gear 2, according to FIG. 2.

To make possible such a double function, the port 5" is designed to have two additional control pockets in the casting (not shown) and a shut-off valve 9.

The essential mode of operation of the gear control system in the respective gears 1 or 2 is briefly described herebelow.

Referring to FIG. 1, a mechanical synchro-shuttle gear 1 is shown in which one switching element SEV1 or SER is provided for each travel direction designed, for example, as a clutch, and several gear steps for reverse drive. In the synchro-shuttle gear 1 shown, the shift valve SV1 serves to change the travel direction while the control valve SV2 either switches the gears or gear to an idle or neutral position by shutting off a passage of pressurized medium, or loads one of the switching element SEV1 or SER with pressure. The travel direction itself is adjusted by the shift valve SV1 by means of the electromagnetic valves Y1 and Y2, the electromagnetic valve Y1 switching the shift valve SV1 in a manner such that the switching element SEV1 is actuated for forward drive, and the electromagnetic valve Y2 switching the shift valve SV1 so that the switching element SER can be loaded with pressurized medium for reverse drive.

In the synchro-shuttle gear 1, the driver of a moving construction machine, for example, can use a button to switch control valve SV2 via the electromagnetic valve Y3 to a neutral position for gearshift. After this, the driver, in a manner known per se, can actuate the mechanical selector gear for gear switching. The control valve SV2 is then brought to the switching state.

In FIG. 1 the control valve SV2 is shown in a non-actuated state, that is, in the neutral position. If the switching element SEV1 should now be actuated for forward drive, then the shift valve SV1 is moved to the left by the electromagnetic valves Y2 and Y1 and the control valve SV2 is switched to the right by means of the electromagnetic valve Y3. If the travel direction changes and the reverse drive switching element SER is actuated, then the shift valve SV1 is similarly switched to the right by the electromagnetic valves Y1 and Y2 and the control valve SV2 remains in the switched position described above.

In a synchro-shuttle gear 1, according to FIG. 1, the port 5" of the control valve SV2 is blocked by the shut-off member 9. In the neutral position of the control valve SV2 said port 5", blocked by shut-off member 9 as shown in FIG. 1, is connected with the port 1" whereby a passage of pressurized medium from the shift valve SV1 through the control valve SV2 to the switching element SEV1 or SEV2 is shut off. In this control valve SV2 neutral position the pressure from the switching element SEV1 is drawn into the tank 8 via a connection between the ports or outlet openings 4" and 3", and from the switching element SER via a connection between the ports 6" and 3".

For blocking control valve SV2 port 5" an intermediate plate is especially recommended for shut-off member 9, since it represents the constructionally simplest and most inexpensive solution.

Referring to FIG. 2, the full-throttle gear 2 shown, unlike the synchro-shuttle gear of FIG. 1, is a mechanical power-shift gear in which the gear must be brought to a neutral position or disengaged before switching. Since it is possible to switch under load in powershift gears, switching the control valve SV2 to a neutral position is not necessary. Instead of this, the driver switches via an electric pulse between a switching element SEV1 for forward drive and another switching element SEV2 for forward drive. The switching element SEV1 for forward drive can stand, for example, for first through third gear steps, and the switching element SEV2 for a fourth gear step. Other different forward speed ranges can be obtained via further switching or pressure lines 10 and 11.

As in the synchro-shuttle gear of FIG. 1, the shift valve SV1 has the function of adjusting the travel direction, the electromagnetic valve Y1 serving, in turn, to switch the shift valve SV1 for actuation of the switching elements SEV1 and SEV2 for forward drive, and the electromagnetic valve Y2 adjusting the shift valve SV1 in a manner such that the switching element SER is actuated for reverse drive.

Instead of the idling position of the control valve SV2 in the synchro-shuttle gear 1 of FIG. 1, said switching position of the control valve SV2 in the powershift gear 2 serves to switch the other switching element SEV2 for forward drive. That is, if the control valve SV2, as described for FIG. 1, is switched to the right, the switching element SEV1 for forward drive, or the switching element SER for reverse drive, is loaded with pressure, depending on the switching state of the shift valve SV1.

Unlike the synchro-shuttle gear 1, in the powershift gear 2 of FIG. 2 the port 5" of the control valve SV2 is connected with the other switching element SEV2 for forward drive. The port 5" is thus open, and in the shown non-actuated state of the control valve SV2 pressure can be passed on via a connection between the port 1" and the port 5" from the shift valve SV1 to the switching element SEV2. If the control valve SV2 of FIG. 2 is now switched by the electromagnetic valve Y3 in such a manner that a passage between the ports 1" and 4" or the ports 2" and 6" is freely switched, then instead of the switching element SEV2, the switching element SEV1 or the switching element SER is actuated, keeping in mind that pressure from the shift valve SV1 to the control valve SV2 is passed only via one line.

Because of the double function of the control valve SV2, the control valve SV2 can be used with identical structural design both in the synchro-shuttle gear 1 and in the powershift gear 2. The other parts, like the valve SV1 and the electromagnetic valves Y1, Y2, Y3, as well as the switching elements SEV1, SEV2, SER, can be used in both kinds of gear with this simple gear control.

In powershift gears, the gear control system described has the added advantage that the hydraulic control of the additional switching element SEV2 can be extensively simplified in construction and thus be of very reasonable cost.

Also, another advantage of the gear control system is that the powershift gear 2, compared to the designs known from the prior art, is substantially easier to switch.

| Reference numerals | |
|---|---|
| 1 | synchro-shuttle gear |
| 2 | powershift gear |
| 3 | external pressure source |
| 4 | external pressure source |

-continued

| Reference numerals | |
|---|---|
| 5 | pressure line |
| 6 | feed-in filter |
| 7 | tank |
| 8 | tank |
| 9 | shut-off part |
| 10 | pressure line |
| 11 | pressure line |
| | 1', 1" port |
| | 2', 2" port |
| | 3', 3" port |
| | 4', 4" port |
| | 5', 5" port |
| | 6', 6" port |
| | 7', 7" port |
| SEV1 | switching element for forward drive |
| SEV2 | switching element for for drive |
| SER | switching element for reverse drive |
| SV1 | shift valve |
| SV2 | control valve |
| Y1 | electromagnetic valve |
| Y2 | electromagnetic valve |
| Y3 | electromagnetic valve |

What is claimed is:

1. A transmission control system for a synchromesh gear transmission and alternatively, a powershift transmission, both transmissions establishing a forward and a reverse drive via the engagement and disengagement of a plurality of clutch switching elements, including at least one forward switching element and one reverse switching element, the transmission control system comprising:

a single shift valve (SV1) actuated by a first switching device and a second switching device for selecting between one of said forward drive and said reverse drive of said synchromesh gear transmission or said powershift transmission when the transmission is coupled to the transmission control system;

a single control valve (SV2) actuated by a third switching device for communicating between the single shift valve and the plurality of clutch switching elements, the control valve having a double function port and a removable shut-off member for blocking said double function port;

wherein said intermediate member blocks flow of pressurized medium through the double function port when the shut-off member is connected to the control valve, the flow of pressurized medium through the double function port being unimpeded when the shut-off member is removed from the control valve;

the control valve (SV2), in addition to the double function port, further including a first port and a second port (1", 2") for receiving pressurized medium from the shift valve (SV1), a third port (3") connectable with a tank (8) and a forth port and a fifth port (4", 6") also connectable with the plurality of clutch switching elements (SEV1, SER).

2. The transmission control system according to claim 1, in combination with said synchromesh gear transmission (1), wherein:

the shut-off member is connected to the control valve; and one of said forward and reverse drives is established by the synchromesh gear transmission depending on the position of the shift valve (SV1) and an operation to change between said forward drive and said reverse drive is facilitated via the control valve (SV2) having a neutral position at which passage of the pressurized medium to the plurality of clutch switching elements is blocked through the control valve (SV2) via the shut-off member and also at which the third port (3") connects the plurality of clutch switching elements with the tank (8).

3. The transmission control system according to claim 1, wherein the first switching device, the second switching device and the third switching device (Y1, Y2, Y3), for actuating the shift valve (SV1) and the control valve (SV2), are a first electromagnetic valve, a second electromagnetic valve and a third electromagnetic valve, respectively.

4. The gear control system according to claim 3, wherein, when the transmission control system is in a state for establishing said forward drive of the synchromesh gear or powershift transmission, the first electromagnetic valve (Y1) actuates the shift valve (SV1) to a position for activating one of said at least one forward switching elements, and when the transmission control system is in a state establishing reverse drive of the synchromesh gear or powershift transmission, the second electromagnetic valve (Y2) actuates the shift valve (SV1) to a position for activating said reverse switching element (SER).

5. The transmission control system according to claim 4, wherein the plurality of switching elements (SEV1, SEV2, SER) are connectable to be loaded with pressure from a first external pressure source (3) and the electromagnetic valves (Y1, Y2, Y3) are connectable to be loaded with a separate pressure from a second pressure source (4).

6. The transmission control system according to claim 1 in combination with said powershift gear transmission (1), wherein:

said shut-off member is not connected to the control valve; and one of said forward drive and said reverse drive is established by the powershift transmission (1) depending on the position of the shift valve (SV1), and an operation to change between two different states of forward drive is facilitated via a control valve (SV2) position allowing passage of the pressurized medium to a second forward switching element of said at least one forward switching element through the control valve (SV2) due to the removal of the shut-off member from the control valve (SV2) and connecting the remaining clutch switching elements with the tank (8) via the third port (3").

* * * * *